US008046691B2

(12) United States Patent
Sankar et al.

(10) Patent No.: US 8,046,691 B2
(45) Date of Patent: Oct. 25, 2011

(54) GENERALIZED INTERACTIVE NARRATIVES

(75) Inventors: Aditya Sankar, Bangalore (IN);
Archana Prasad, Redmond, WA (US);
Narendranath D. Govindachetty, Bangalore (IN); Joseph Joy, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 363 days.

(21) Appl. No.: 12/347,868

(22) Filed: Dec. 31, 2008

(65) Prior Publication Data
US 2010/0169776 A1 Jul. 1, 2010

(51) Int. Cl.
*G06F 3/00* (2006.01)
(52) U.S. Cl. .................. 715/730; 715/716; 715/726
(58) Field of Classification Search .................. 715/716, 715/730, 719–722
See application file for complete search history.

(56) References Cited

U.S. PATENT DOCUMENTS

| | | | | |
|---|---|---|---|---|
| 5,751,953 A * | 5/1998 | Shiels et al. | .................. | 715/720 |
| 6,097,393 A * | 8/2000 | Prouty et al. | .................. | 345/419 |
| 6,369,835 B1 * | 4/2002 | Lin | .................. | 715/726 |
| 6,544,040 B1 | 4/2003 | Brelis et al. | | |
| 7,062,712 B2 * | 6/2006 | Schneider et al. | ............ | 715/721 |
| 7,246,315 B1 | 7/2007 | Andrieu et al. | | |
| RE39,830 E * | 9/2007 | Balabanovic | .................. | 345/419 |
| 7,266,771 B1 * | 9/2007 | Tow et al. | .................. | 715/719 |
| 7,309,283 B2 | 12/2007 | Nemitz | | |
| 7,496,211 B2 * | 2/2009 | Yamagami et al. | ............ | 382/103 |
| 7,669,128 B2 * | 2/2010 | Bailey et al. | .................. | 715/719 |
| 7,818,658 B2 * | 10/2010 | Chen | .................. | 715/201 |
| 7,904,812 B2 * | 3/2011 | Atlas et al. | .................. | 715/716 |
| 2002/0154174 A1 * | 10/2002 | Redlich et al. | .................. | 345/848 |
| 2004/0267816 A1 | 12/2004 | Russek | | |
| 2006/0277470 A1 * | 12/2006 | Schneider et al. | ............ | 715/719 |
| 2007/0073475 A1 * | 3/2007 | Endo | .................. | 701/207 |
| 2007/0113182 A1 * | 5/2007 | Hollemans | .................. | 715/723 |
| 2009/0031246 A1 * | 1/2009 | Cowtan et al. | .................. | 715/786 |

OTHER PUBLICATIONS

Kjeldskov, Jesper et al., "Augmenting the City with Fiction: Fictional Requirements for Mobile Guides," MobileHCI '07, Sep. 2007, Singapore, 2004 ACM, 6 pages, http://www.medien.ifi.lmu.de/mirw2007/papers/MGuides2007_Kjeldskov.pdf [last accessed Mar. 18, 2009].

Hermann, Thomas et al., "Sound and Meaning in Auditory Data Display," Proceedings of the IEEE, vol. 92, No. 4, Apr. 2004, pp. 730-741, http://ieeexplore.ieee.org/stamp/stamp.jsp?arnumber=1278694&isnumber=28591 [last accessed Mar. 18, 2009].

(Continued)

*Primary Examiner* — Ashraf Zahr
(74) *Attorney, Agent, or Firm* — Perkins Coie LLP

(57) ABSTRACT

A multimedia system specifies a multimedia experience stream by a narrative definition that defines a narrative presentation having sub-narratives. Each sub-narrative may incorporate multiple streams of different types of media with each stream defining a "path" through content of that media type. The multimedia system directs the presentation of the sub-narratives by interfacing with presentation components for each media type through a custom interface component for that media type that implements a common application interface. When a user pauses a presentation, the user can manually navigate around the content of a stream from the current location at the time of the pause to another location. When the user resumes the presentation, the multimedia system automatically transitions from the navigated-to location to the current location at the time of the pause to resume the presentation from where it was paused.

20 Claims, 12 Drawing Sheets

OTHER PUBLICATIONS

Sparacino, Flavia, "Narrative Spaces: Bridging Architecture and Entertainment via Interactive Technology," 6th International Conference on Generative Art, 2002, MIT Media Lab, pp. 1-15, http://alumni.media.mit.edu/~flavia/Papers/NarrativeSpaces.pdf [last accessed Mar. 18, 2009].

Benford, Steve et al., "Temporal Trajectories in Shared Interactive Narratives," CHI 2008 Proceedings, Apr. 5-10, 2008, Florence, Italy, pp. 73-82, http://www.mrl.nott.ac.uk/~sdb/research/downloadable/%20papers/temporal-trajectories-dl.pdf [last accessed Mar. 18, 2009].

Gray, Jim et al., "The World-Wide Telescope, an Archetype for Online Science," Technical Report, MSR-TR-2002-75, Microsoft Research, Jun. 2002, pp. 1-4, ftp://ftp.research.microsoft.com/pub/tr/tr-2002-75.pdf [last accessed Mar. 18, 2009].

"Google Earth," 1 page, http://earth.google.com, Oct. 7, 2008 [last accessed Mar. 18, 2009].

Kilfeather, Eoin et al., "An Ontological Application for Archaeological Narratives," Proceedings of the 14th International Workshop on Database and Expert Systems Applications (DEXA'03), 2003 IEEE, 5 pages, http://ieeexplore.ieee.org/stamp/stamp.jsp?arnumber=1232007&isnumber=27592 [last accessed Mar. 19, 2009].

"Capturing and Viewing Gigapixel Images," SIGGRAPH 2007, 1 page, http://johanneskopf.de/publications/gigapixel/index.html [last accessed Mar. 19, 2008].

"Microsoft Live Labs, Photosynth," 1 page, Oct. 7, 2008 http://photosynth.net [last accessed Mar. 19, 2009].

"Microsoft Research, World-Wide Telescope," 1 page, Oct. 7, 2008, http://www.worldwidetelescope.org/ [last accessed Mar. 19, 2009].

Mulholland, Paul et al., "Using Digital Narratives to Support the Collaborative Learning and Exploration of Cultural Heritage," Proceedings of the 13th International Workshop on Database and Expert Systems Applications (DEXA'02), 2002 IEEE, 5 pages, http://ieeexplore.ieee.org/stamp/stamp.jsp?arnumber=1045951&isnumber=22410 [last accessed Mar. 19, 2009].

Szilas, Nicholas et al., "Minimal Structures for Stories," SRMC'04, Oct. 15, 2004, New York, New York, USA, 2004 ACM, pp. 25-32, http://delivery.acm.org/10.1145/1030000/1026639/p25-szilas.pdf?key1=1026639&key2=7392443221&coll=GUIDE&dl=GUIDE&CFID=540219&CFTOKEN=89988959 [last accessed Mar. 19, 2009].

\* cited by examiner

GENERALIZED INTERACTIVE NARRATIVES

BACKGROUND

Traditional presentation media including photographs, slideshows, videos, animations, and so on have been used to develop multimedia presentations. For example, a presentation with video and animation may be developed by a teacher to help explain certain concepts to students. As another example, a slideshow may be developed to assist a person in presenting a complex topic at a conference. These traditional presentation media have been augmented with advanced tools for presenting complex computer-based presentation media such as Google Earth and Microsoft's Virtual Earth, Photosynth, HDView, and Xtensible Application Markup Language ("XAML") renderers or presentation components.

Microsoft's Virtual Earth is a geospatial mapping tool that allows developers to create applications that layer location-relevant data on top of the Virtual Earth map images. The images are collected from satellites, aerial cameras, and other sources. Microsoft Photosynth is a tool that analyzes digital images of an object uploaded by a user to build a three-dimensional point cloud of the object. Pattern recognition components of Photosynth compare portions of images to create points, which are then compared to convert the image into a model. Users can interactively view Photosynth collections online by means of a 3D viewer. HD View is an image viewer tool that assists in the display of very large images. The digital images are stitched together to create images that can be in excess of a gigapixel in size. Such a gigapixel image may represent a panoramic view. HD View provides an interface for viewing such gigapixel images using panning and zooming. "XAML" can be used to define presentations that include visual and audio content that is rendered by a XAML renderer tool such as Microsoft's Windows Presentation Foundation.

Although these advanced tools can be used to generate complex presentations, these tools each provide very different user interfaces and application interfaces. A person who wants to prepare a presentation would select the tool that is most appropriate and develop the presentation using that tool. The person may create the media for the presentation from scratch and/or may extract portions of existing media and customize them for the presentation. Different portions of a presentation might be more effectively presented with a different tool or might already exist in different types of media or by using a combination of different types of media. Using current tools, however, it can be difficult to develop a presentation from these different types of media.

SUMMARY

A method and system for generating a multimedia experience stream is provided. In some embodiments, a multimedia system specifies a multimedia experience stream by a narrative definition that defines a narrative presentation having sub-narratives. Each sub-narrative may incorporate multiple streams of different types of media with each stream defining a "path" through content of that media type. The multimedia system directs the presentation of the sub-narratives by interfacing with presentation components for each media type through a custom interface component for that media type that implements a common application interface. When a user pauses a presentation, the user can manually navigate around the content of a stream from the current location at the time of the pause to another location. When the user resumes the presentation, the multimedia system automatically transitions from the navigated-to location to the current location at the time of the pause to resume the presentation from where it was paused.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
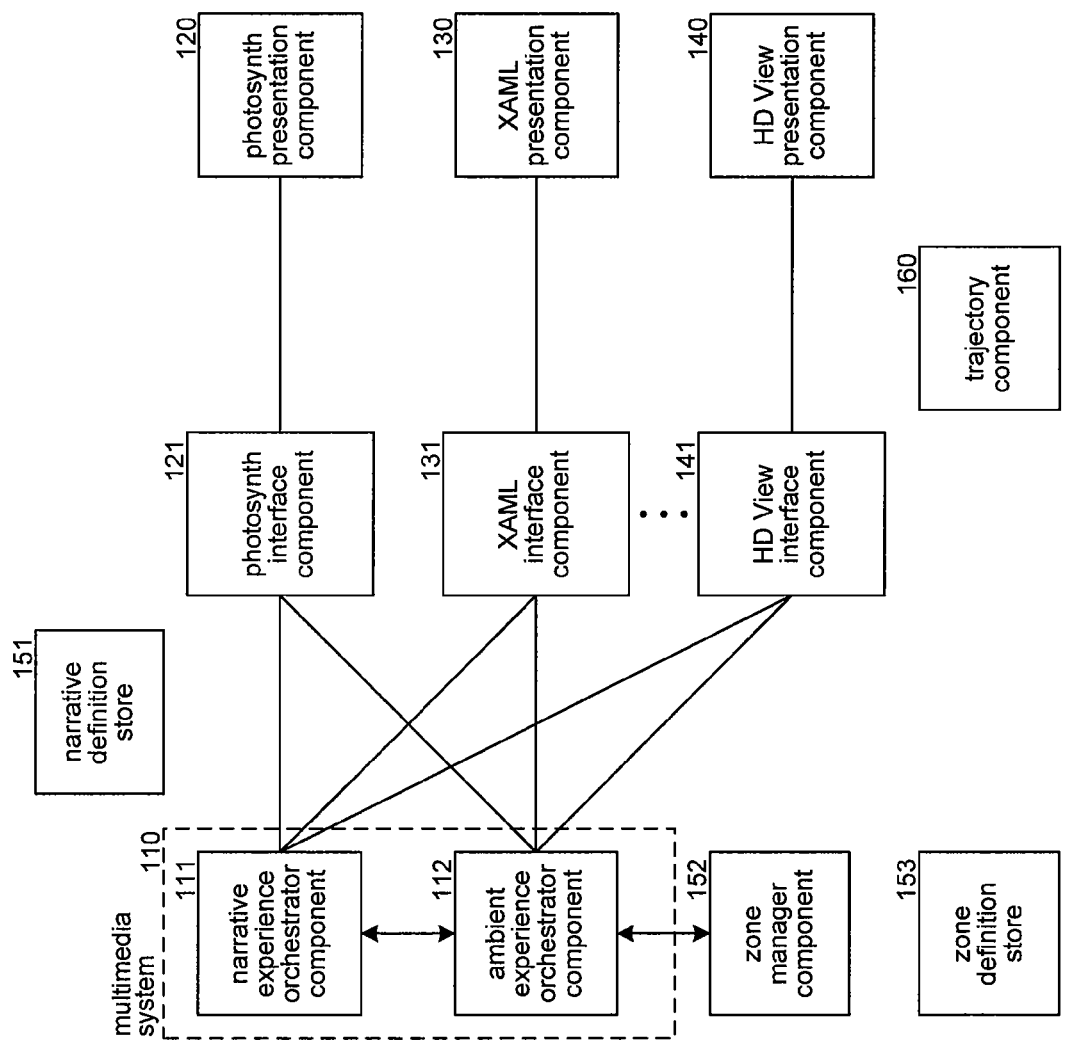
FIG. 1 is a block diagram illustrating components associated with the multimedia system in some embodiments.

A method and system for generating a multimedia experience stream is provided. In some embodiments, a multimedia system specifies a multimedia experience stream by a narrative definition that defines a narrative presentation having sub-narratives. For example, each sub-narrative may correspond to a different scene of the narrative presentation. Each sub-narrative may incorporate multiple streams of different types of media (e.g., video and audio) with each stream defining a "path" through content of that media type. The multimedia system directs the presentation of the sub-narratives by interfacing with presentation components for each media type through a custom interface component for that media type that implements a common application interface. The multimedia system provides a user interface through which a user can control the starting, pausing, resuming, and so on of the presentation. When a user pauses a presentation, the user can manually navigate around the content of a stream, moving from the current location at the time of the pause to another location. When the user resumes the presentation, the multimedia system automatically transitions from the navigated-to location to the current location at the time of the pause to resume the presentation from where it was paused. The multimedia system may calculate a trajectory or transition path within the content of a stream to transition through the content of a stream from the location at the time of the resume to the location at the time of the pause so that the presentation can resume from where it was paused. The multimedia system thus allows presentations to be created that combine content developed by different advanced tools (e.g., Photosynth) that may currently exist or may be developed in the future.

In some embodiments, a narrative experience orchestrator component of the multimedia system coordinates the presentation of a narrative presentation or narrative that includes sub-narratives. For example, one sub-narrative may include a stream that presents a visual path through a gigapixel image, and another stream that presents an audio of a narrator describing various objects that can be seen along the visual path through the image. Each stream of a sub-narrative specifies content (e.g., a gigapixel image) and either an explicit or implicit path through the content (e.g., starting at one point and panning to and ending at another point). A narrative experience orchestrator component of the multimedia system generates an experience stream as defined by a narrative by presenting each of its sub-narratives in sequence. To present a sub-narrative, the narrative experience orchestrator component provides a definition of each stream to an interface component that processes streams of a certain media type. Each interface component interfaces with a presentation component (e.g., an HD View presentation component) to present that stream such that the streams of the sub-narrative are presented in parallel (e.g., the path through an image is accompanied by audio describing the image). Each interface component provides a common application interface that is invoked by the narrative experience orchestrator component to control the presentation of a stream. Each interface component maps the controls provided by the narrative experience orchestrator through the common application interface to a type-specific interface provided by a type-specific presentation component such as a Photosynth component or HD View component. Because each interface component provides a common application interface, the narrative experience orchestrator component can control the presenting of media of any type as long as an interface component is developed for that media type.

In some embodiments, the multimedia system provides a user interface through which a user can control the presentation of a narrative by indicating when to start a sub-narrative and when to pause and resume a sub-narrative. When a sub-narrative that is currently being presented is paused, the narrative experience orchestrator sends a pause notification via the common application interface to each interface component currently presenting a stream. Upon receiving a pause notification, an interface component records a pause location and effects the pausing of the stream being presented by that interface component. For example, if an interface component is presenting an audio stream, it may record the current location within the audio stream as a pause location (e.g., a time within the audio content) and continue playing the audio over a transition period (e.g., 2 seconds) of decreasing volume and then stop playing the audio. When the user indicates to resume the sub-narrative, the narrative experience orchestrator sends a resume notification via the common application interface to each interface component. Upon receiving a resume notification, an interface component identifies the pause location and restarts the presenting of the stream at the pause location. For example, an interface component that is presenting an audio stream may resume presenting the audio starting at a transition period before the pause location with increasing volume up to the pause location and continuing after the pause location at the same volume as when the stream was paused.

In some embodiments, when a sub-narrative is paused, a user may use the user interface of a type-specific presentation component to navigate through the content of the stream. For example, if a gigapixel image is being presented by an HD View presentation component as part of the sub-narrative, then a user who pauses the sub-narrative may use the user interface to navigate to different portions of the gigapixel image at different zoom levels. When the user indicates to resume the sub-narrative, the interface component effects a smooth transition from the navigated-to location to the pause location so that the sub-narrative can continue at the pause location. The multimedia system may provide a trajectory component that generates a trajectory path from the navigated-to location to the pause location. The trajectory component may identify a sequence of locations (and zoom levels) of the gigapixel image that should be displayed to return to the pause location (and pause zoom level) over a transition period. For example, if the transition period is two seconds, the sequence may represent 60 different locations on a path from the navigated-to location to the pause location. More generally, the trajectory component may generate trajectories for arbitrary "orientations," which may include a location, direction of view, zoom level, and so forth. For example, if the content being presented provides a three-dimensional view of the inside and outside of a building, then a user may pause the sub-narrative while viewing the front door of the building from the outside. While the sub-narrative is paused, the user may navigate through the building to view different rooms. When the user indicates to resume the sub-narrative, the interface component may use the trajectory component to generate a sequence of orientations to transition from the navigated-to location inside the building to the pause location outside the building.

In some embodiments, the multimedia system permits a narrative to identify ambient artifacts that are associated with different "regions" within a multimedia experience stream. A region is a volume within the space of the multimedia experience stream. For example, if a stream of a sub-narrative is a gigapixel image of a bell tower, then the region around the top of the bell tower may be considered to be a "bell" zone, and the region around the front door of the bell tower may be considered an "entry" zone. As the experience stream follows a path that approaches the top of the bell tower, the multimedia system determines that the bell zone is active and notifies each interface component. Upon being notified, the audio interface component that is presenting a narrator's voice may start outputting the sound of bells in the background. As the path gets nearer to the top, the sound of the bells may become louder. If a user pauses the sub-narrative and navigates around the bell tower, the multimedia system may also send notifications to the interface components indicating any currently active zones so that each interface component can output the appropriate ambient artifacts. In addition to audio, ambient artifacts can include visual aspects such as pop-up windows displaying additional information associated with a zone. Each narrative may specify a zone manager that is responsible for identifying the currently active zones based on the current location or more generally the current orientation. An ambient experience orchestrator component of the multimedia system may receive current location information from an interface component (e.g., an HD View interface component) and invoke the zone manager to identify the active zones. The ambient experience orchestrator component then sends a notification of the active zones to each interface component so that it can present ambient artifacts as appropriate.

FIG. 1 is a block diagram illustrating components associated with the multimedia system in some embodiments. The multimedia system 110 interfaces with a Photosynth presentation component 120, a XAML presentation component 130, and an HD view presentation component 140 via a Photosynth interface component 121, a XAML interface component 131, and an HD View interface component 141. The Photosynth interface component, the XAML interface component, and the HD View interface component implement the common application interface that is exposed to the multimedia system 110. The multimedia system includes a narrative experience orchestrator component 111 and ambient experience orchestrator component 112. A narrative presentation is specified by a narrative definition store 151, a zone manager component 152, and zone definitions of a zone definition store 153. To present an experience stream, the narrative experience orchestrator component inputs the narrative definition and loads the zone manager for the narrative. The narrative experience orchestrator component presents each sub-narrative of the narrative by passing the stream definition for a media type to each interface component for that media type. The narrative experience orchestrator component presents a user interface to allow the user to start a sub-narrative and to pause and resume the sub-narrative. The ambient experience orchestrator component may receive location information from an interface component and invoke the zone manager to identify the currently active zones based on the zone definition. The ambient experience orchestrator component then sends notifications to the interface components indicating the active zones so that the appropriate artifacts can be presented. For example, a sub-narrative may include a path through a gigapixel image that is implemented by the HD View interface component. The HD View interface component may periodically send location information to the ambient experience orchestrator component so that the active zones can be identified and notifications provided to the interface components. The interface components may invoke a common trajectory component 160 to generate "paths" between a current orientation and a desired to orientation that form the path through the content of the stream.

Figure 2:
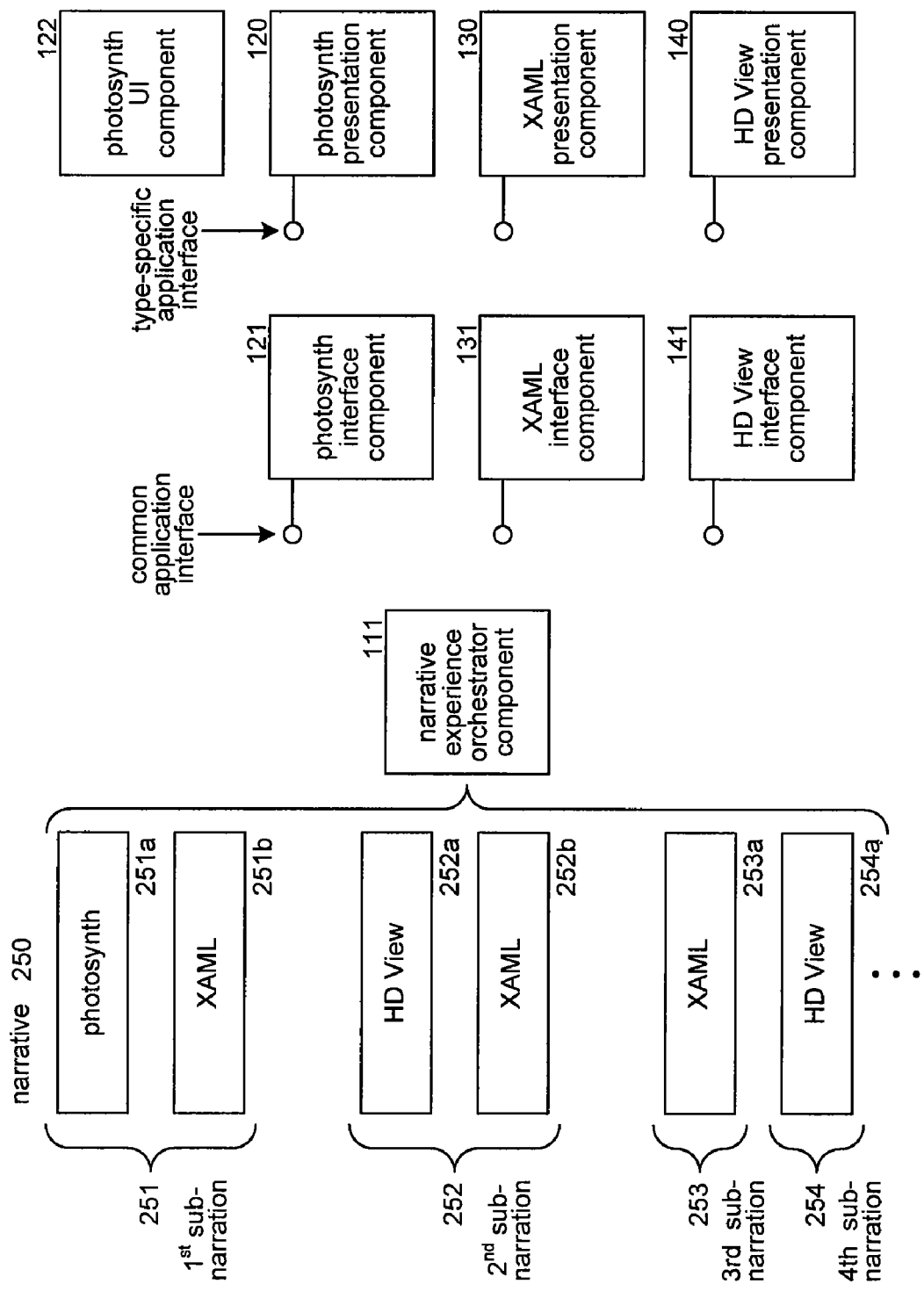
FIG. 2 is a block diagram that illustrates a logical organization of a narrative.

FIG. 2 is a block diagram that illustrates a logical organization of a narrative. A narrative 250 includes sub-narratives 251, 252, 253, and 254. Sub-narrative 251 includes a Photosynth stream 251a and a XAML stream 251b, sub-narrative 252 includes an HD View stream 252a and a XAML stream 252b, sub-narrative 253 includes a XAML stream 253a, and sub-narrative 254 includes an HD View stream 254a. The narrative experience orchestrator component 111 presents the narrative by providing a user interface through which a user can indicate to start the narrative and individual sub-narratives. When the user indicates to start the narrative, the narrative experience orchestrator component inputs the definition of sub-narrative 251 and identifies the Photosynth stream 251a and the XAML stream 251b. The narrative experience orchestrator component passes the appropriate stream definitions to the Photosynth interface component 121 and the HD View interface component 141 via their common application interfaces. The Photosynth interface component 121 then interfaces with the Photosynth presentation component 120 via its type-specific application interface to present the Photosynth stream 251a. The XAML interface component 131 interfaces with the XAML presentation component 130 via its type-specific application interface to output the audio associated with the XAML stream 251b. If the user indicates to pause the sub-narrative, the narrative experience orchestrator component notifies the Photosynth interface component 121 and the XAML interface component 131 of the pause. Upon receiving the pause verification, the components implement a transition trajectory to pause the stream at a pause orientation. The Photosynth interface component 121 may then allow the user to navigate around the Photosynth content using a Photosynth user interface component 122. When the user indicates to resume the sub-narrative, the narrative experience orchestrator component notifies the interface components of the resume. Upon receiving the resume notification, an interface component implements a transition trajectory to transition from the navigated-to orientation to the pause orientation.

Table 1 illustrates an example definition of a narrative. Lines 1-5 identify the media types used by the narrative, which are Photosynth, HD View, and XAML. Lines 6-18 identify a narrative with three sub-narratives. Lines 7-9 identify the first sub-narrative, which includes one stream for XAML content. Its duration is 46 seconds, and its configuration data for the presentation is identified by source. The other elements of the stream represent attributes that control the presentation of the audio. Lines 10-13 identify the second sub-narrative, which includes two streams, one for Photosynth content and one for XAML content. The Photosynth content is identified by the synthURL, and configuration data for the presentation is identified by source. Lines 14-17 identify the third sub-narrative, which also has Photosynth and XAML streams.

TABLE 1

```
1.   <ExperienceStreamProviders>
2.     <ExperienceStreamProvider type="PhotoSynth" />
3.     <ExperienceStreamProvider type="HDView" />
4.     <ExperienceStreamProvider type="Xaml" />
5.   </ExperienceStreamProviders>
6.   <Narrative>
7.     <SubNarrative name="Scene1" duration="00:46:00">
8.       <StreamData type="Xaml" source="ConfigData\Scene1\Scene1.xaml"
             foregroundMediaElement="ForeGroundAudio"
             playNextCommandElementName="HistoryAndLegend" disableTransitionEffects="true" />
9.     </SubNarrative>
10.    <SubNarrative name="Scene2" duration="00:40:00">
11.      <StreamData type="PhotoSynth" source="ConfigData\Scene2\Scene2PS.xml"
             synthURL="http://localhost/DH/root/Scene2_Synth.aspx" />
12.      <StreamData type="Xaml" source="ConfigData\Scene2\Scene2.xaml"
             storyboardResourceName="Storyboard1" foregroundMediaElement="ForeGroundAudio"
             backgroundMediaElement="BackGroundAudio" />
13.    </SubNarrative>
```

TABLE 1-continued

```
14.    <SubNarrative name="Scene3" duration="00:33:00">
15.       <StreamData type="PhotoSynth" source="ConfigData\Scene3\Scene3PS.xml"
             synthURL="http://localhost/DH/root/Scene3_Synth.aspx" />
16.       <StreamData type="Xaml" source="ConfigData\Scene3\Scene3.xaml"
             storyboardResourceName="Storyboard1" foregroundMediaElement="ForeGroundAudio"
             backgroundMediaElement="BackGroundAudio" />
17.    </SubNarrative>
18. </Narrative>
```

Table 2 illustrates sample configuration data for a Photosynth stream. The configuration data identifies four keyframes. Lines 2-10 represent the first keyframe, which corresponds to the third frame of the path. The elements X, Y, and Z identify a position of a view within the content, the elements thetaX, thetaY, and thetaZ identify a direction of view within the content, and the element zoom identifies the zoom level of the keyframe. Lines 11-19 represent the second keyframe, lines 20-28 represent the third keyframe, and lines 29-37 represent the fourth keyframe, which correspond to frames 18, 22, and 33 of the path. The Photosynth interface component uses the trajectory component to calculate a path of frames that lead from one keyframe to the next keyframe to generate the frames to be presented to the Photosynth presentation component.

TABLE 2

```
1.  <PSKeyframes>
2.    <PSKeyframe KeyframeReference="3">
3.      <X>-0.189766</X>
4.      <Y>0.0584303</Y>
5.      <Z>-0.00664936</Z>
6.      <ThetaX>2.36891</ThetaX>
7.      <ThetaY>-2.4235</ThetaY>
8.      <ThetaZ>-2.44984</ThetaZ>
9.      <Zoom>620.2518208</Zoom>
10.   </PSKeyframe>
11.   <PSKeyframe KeyframeReference="18">
12.     <X>0.191378</X>
13.     <Y>-0.0239885</Y>
14.     <Z>0.012931</Z>
15.     <ThetaX>2.29472</ThetaX>
16.     <ThetaY>-2.37107</ThetaY>
17.     <ThetaZ>-2.64812</ThetaZ>
18.     <Zoom>908.400095999999</Zoom>
19.   </PSKeyframe>
20.   <PSKeyframe KeyframeReference="22">
21.     <X>0.174443</X>
22.     <Y>-0.0303986</Y>
23.     <Z>0.0115524</Z>
24.     <ThetaX>2.1132</ThetaX>
25.     <ThetaY>-2.16381</ThetaY>
26.     <ThetaZ>-3.15359</ThetaZ>
27.     <Zoom>1500.67024</Zoom>
28.   </PSKeyframe>
29.   <PSKeyframe KeyframeReference="33">
30.     <X>0.723366</X>
31.     <Y>-0.0350017</Y>
32.     <Z>0.0296857</Z>
33.     <ThetaX>2.39461</ThetaX>
34.     <ThetaY>-2.40138</ThetaY>
35.     <ThetaZ>-2.49291</ThetaZ>
36.     <Zoom>899.877088</Zoom>
37.   </PSKeyframe>
38. </PSKeyframes>
```

Table 3 illustrates sample configuration data for a XAML stream. The configuration data defines that the stream includes foreground and background audio and a visual element." Lines 3-17 identify keyframes for a background visual element and a "minimap" visual element. Lines 19-24 identify the content of the audio and the visual elements and associated attributes.

TABLE 3

```
1.  <Window>
2.    <Window.Resources>
3.      <Storyboard x:Key="Storyboard1">
4.        <DoubleAnimationUsingKeyFrames BeginTime="00:00:00"
            Storyboard.TargetName="backcanvas"
            Storyboard.TargetProperty="(UIElement.Opacity)" FillBehavior="HoldEnd">
5.          <SplineDoubleKeyFrame KeyTime="00:00:00" Value="1"/>
6.          <SplineDoubleKeyFrame KeyTime="00:00:02" Value="0.01"/>
7.          <SplineDoubleKeyFrame KeyTime="00:00:32" Value="0.01"/>
8.          <SplineDoubleKeyFrame KeyTime="00:00:33" Value="0"/>
9.        </DoubleAnimationUsingKeyFrames>
10.       <DoubleAnimationUsingKeyFrames BeginTime="00:00:02"
            Storyboard.TargetName="minimap" Storyboard.TargetProperty="(UIElement.Opacity)"
            FillBehavior="HoldEnd">
11.         <SplineDoubleKeyFrame KeyTime="00:00:00" Value="0"/>
12.         <SplineDoubleKeyFrame KeyTime="00:00:01" Value="1"/>
13.         <SplineDoubleKeyFrame KeyTime="00:00:06" Value="1"/>
14.         <SplineDoubleKeyFrame KeyTime="00:00:07" Value="0"/>
15.       </DoubleAnimationUsingKeyFrames>
16.     </Storyboard>
17.   </Window.Resources>
18.
19.   <Grid x:Name="LayoutRoot">
```

TABLE 3-continued

```
20.  <Canvas x:Name="backcanvas" Background="Black" Opacity="1"></Canvas>
21.  <MediaElement HorizontalAlignment="Left" Margin="447.08,0,0,283.429"
        x:Name="ForeGroundAudio" VerticalAlignment="Bottom" Width="0" Height="0"
        Stretch="Fill" Grid.Column="1"
        Source="pack://siteoforigin:,,,/ConfigData/Scene3/Audio/Slide3_foreground.wma"/>
22.  <MediaElement HorizontalAlignment="Left" Margin="447.08,0,0,283.429"
        x:Name="BackGroundAudio" VerticalAlignment="Bottom" Width="0" Height="0"
        Stretch="Fill" Grid.Column="1"
        Source="pack://siteoforigin:,,,/ConfigData/Scene3/Audio/Slide3_background.wma"/>
23.  <Image Margin="45.361,600,0,0" Opacity="0"
        Source="pack://siteoforigin:,,,/ConfigData/Scene3/Images/MiniMapFromSynths.png"
        Stretch="Fill" Height="406" VerticalAlignment="Top" Width="300"
        HorizontalAlignment="Left" x:Name="minimap"/>
24.  </Grid>
25. </Window>
```

The computing device on which the multimedia system may be implemented may include a central processing unit, memory, input devices (e.g., keyboard and pointing devices), output devices (e.g., display devices), and storage devices (e.g., disk drives). The memory and storage devices are computer-readable storage media that may contain instructions that implement the multimedia system. In addition, the data structures and message structures may be transmitted via a computer-readable data transmission medium, such as a signal on a communications link. Various communications links may be used, such as the Internet, a local area network, a wide area network, or a point-to-point dial-up connection. The computer-readable media include computer-readable storage media and computer-readable data transmission media.

The multimedia system may be implemented in and/or used by various operating environments. The operating environment described herein is only one example of a suitable operating environment and is not intended to suggest any limitation as to the scope of use or functionality of the multimedia system. Other well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The multimedia system may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 3:
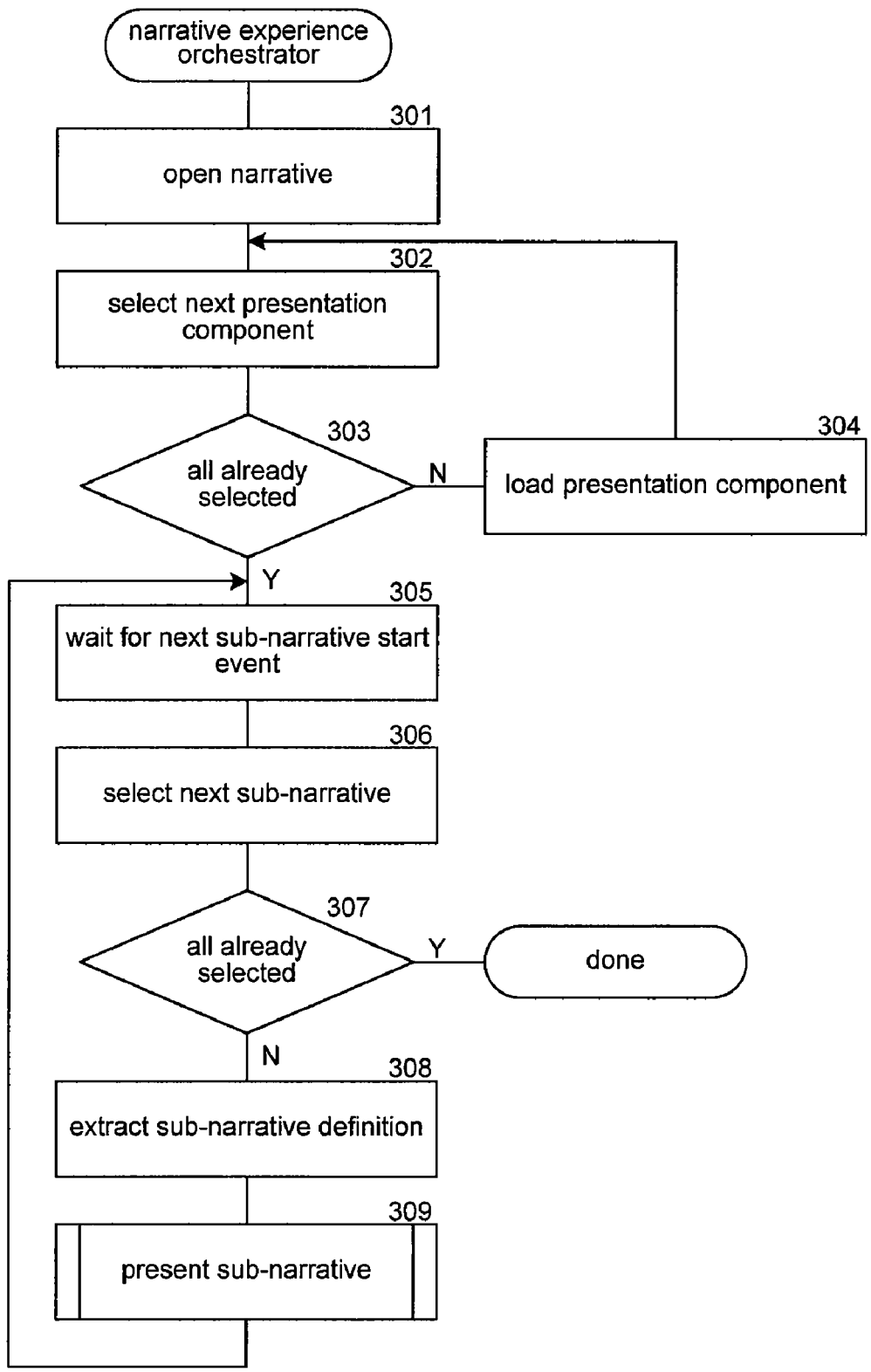
FIG. 3 is a flow diagram that illustrates the processing of a narrative experience orchestrator component in some embodiments.

FIG. 3 is a flow diagram that illustrates the processing of a narrative experience orchestrator component in some embodiments. In block 301, the component opens a narrative file defining the narrative that is to be presented. In blocks 302-304, the component loads the zone manager (not shown) for the narrative as identified by the narrative file and loops loading the presentation component for the narrative. In block 302, the component selects the next presentation component specified in the narrative. In decision block 303, if all the presentation components have already been selected, then the component continues at block 305, else the component continues at block 304. In block 304, the component loads the selected presentation component and then loops to block 302 to select the next presentation component. In blocks 305-309, the component loops waiting for a next sub-narrative start event and presenting the next sub-narrative of the narrative. In block 305, the component waits for the next sub-narrative start event. A sub-narrative start event may be generated by the multimedia system when a user indicates to start the next sub-narrative via the user interface. Alternatively, the previously presented sub-narrative may indicate to automatically start the next sub-narrative. In block 306, the component selects the next sub-narrative. In decision block 307, if all the sub-narratives have already been selected, then the component completes, else the component continues at block 308. In block 308, the component extracts the sub-narrative definition from the narrative. In block 309, the component invokes the present sub-narrative component to present the sub-narrative defined by the extracted definition. The component then loops to block 305 to wait for the next sub-narrative start event.

Figure 4:
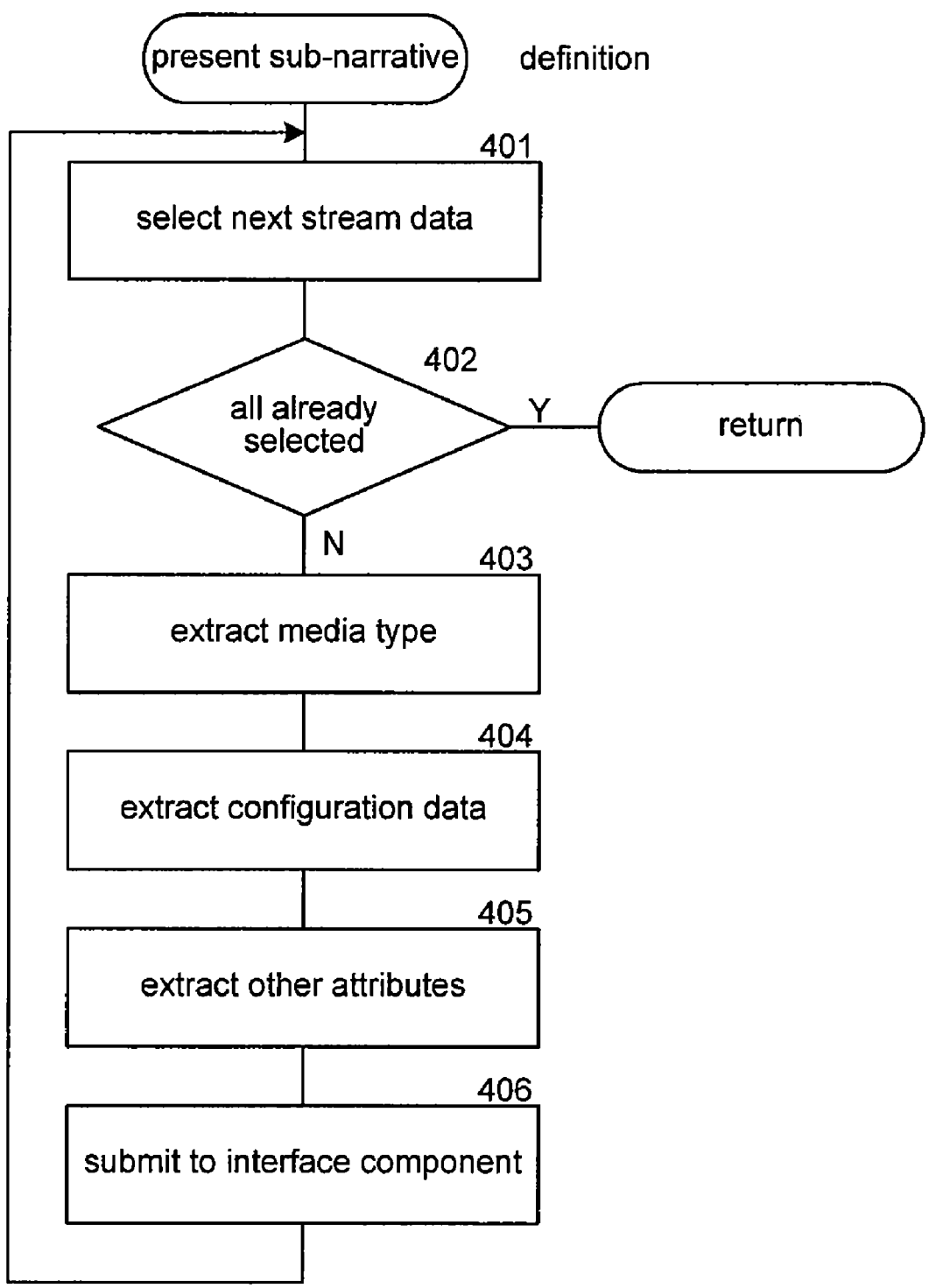
FIG. 4 is a flow diagram that illustrates the processing of a present sub-narrative component in some embodiments.

FIG. 4 is a flow diagram that illustrates the processing of a present sub-narrative component in some embodiments. The component is passed a sub-narrative definition and loops passing each stream definition to the appropriate interface component. In block 401, the component selects the next stream definition of the passed sub-narrative. In decision block 402, if all the stream definitions have already been selected, then the component returns, else the component continues at block 403. In block 403, the component extracts the media type of the selected stream. In block 404, the component extracts the configuration data of the selected stream. In block 405, the component extracts other attributes of the selected stream, which may include an identifier of the content of the stream. In block 406, the component submits the configuration data and other attributes to the interface component for the extracted media type via the common application interface and then loops to block 401 to select the next stream definition.

Figure 5:
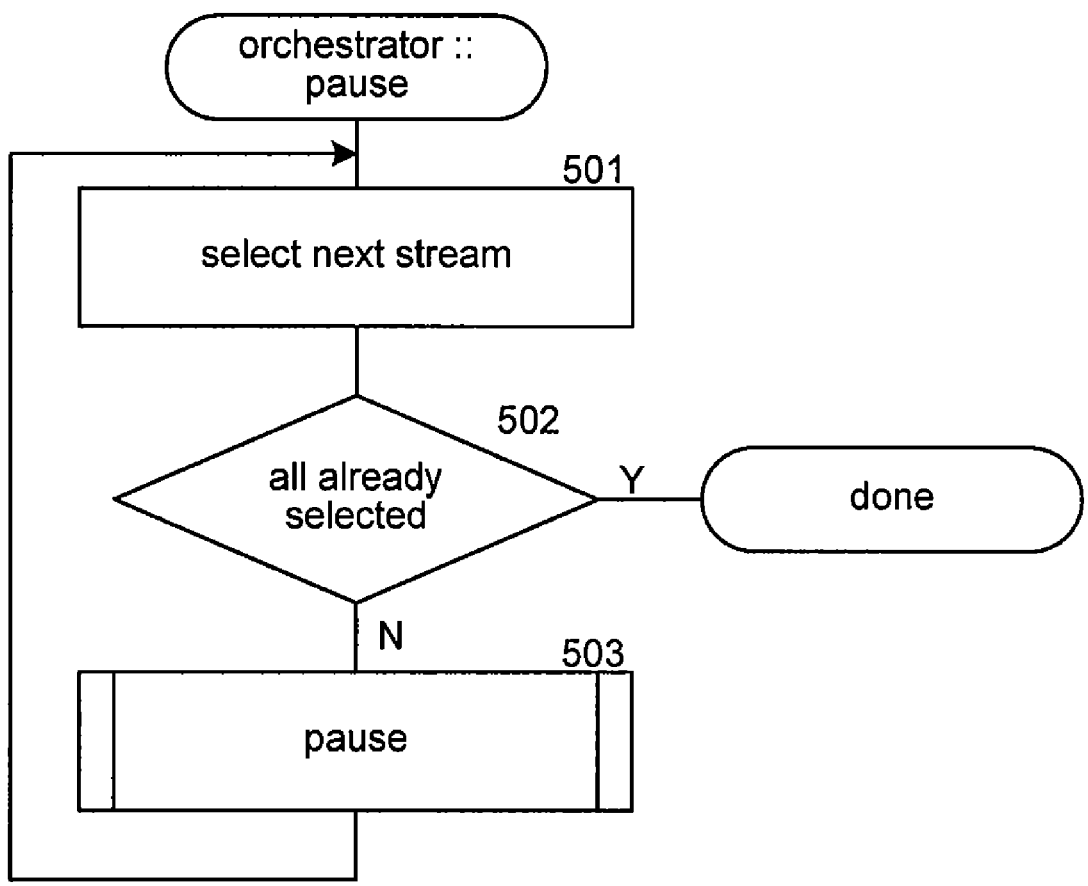
FIG. 5 is a flow diagram that illustrates the processing of a pause component of the multimedia system in some embodiments.

FIG. 5 is a flow diagram that illustrates the processing of a pause component of the multimedia system in some embodiments. The pause component is invoked whenever a user indicates to pause the sub-narrative currently being presented. The component loops notifying each interface component used by the sub-narrative to pause. In block 501, the component selects the next stream of the sub-narrative. In block 502, if all the streams of the sub-narrative have already been selected, then the component completes, else the component continues at block 503. In block 503, the component invokes the pause function of the interface component for the selected stream and then loops to block 501 to select the next stream. Although not illustrated by a flow diagram, the multimedia system includes a resume component that functions in a manner similar to the pause component.

Figure 6:
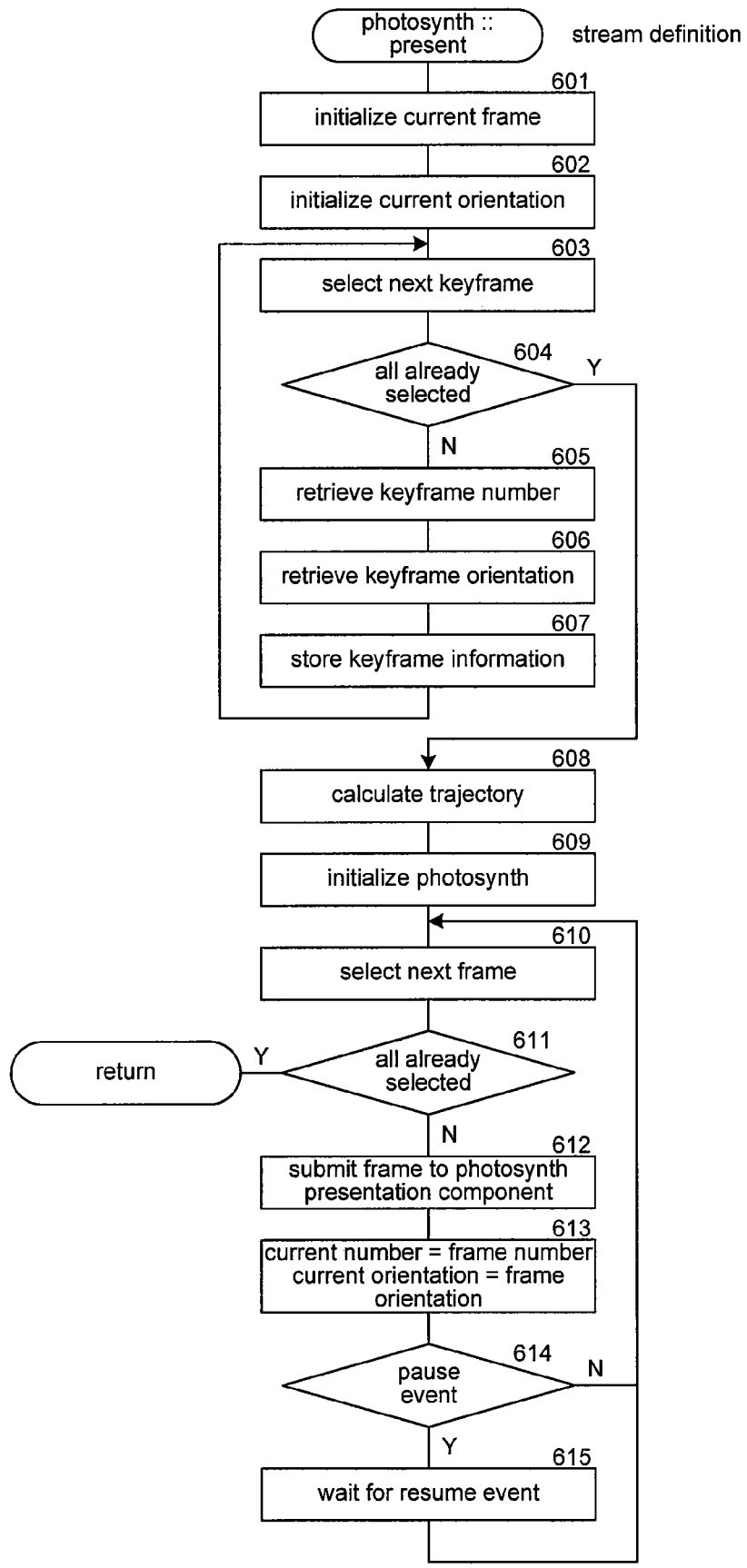
FIG. 6 is a flow diagram that illustrates the processing of a present function of the common application interface of a Photosynth interface component in some embodiments.

FIG. 6 is a flow diagram that illustrates the processing of a present function of the common application interface of a Photosynth interface component in some embodiments. The present function is invoked by the narrative experience orchestrator component to initiate the presentation of a Photosynth stream of a sub-narrative. The component is passed a stream definition. A stream definition for a Photosynth stream defines keyframes along a path through the stream. Each keyframe has an associated orientation and number. The orientation identifies parameters that are understood by the Photosynth viewer such as location, direction of view, and zoom of the keyframe. The reference number of a keyframe indicates the frame that the keyframe corresponds to during presentation of the stream. For example, a frame number of 10 indicates that the keyframe should be the $10^{th}$ frame of the stream. The component generates a sequence of frames that defines a trajectory between one keyframe and the next keyframe.

In block 601, the component initializes a current time for the stream. In block 602, the component initializes a current orientation for the stream, which may be derived from the stream definition. In blocks 603-607, the component loops loading keyframe information. In block 603, the component selects the next keyframe. In decision block 604, if all the keyframes have already been selected, then the component continues at block 608, else the component continues at block 605. In block 605, the component retrieves the frame number for the selected keyframe as the next keyframe. In block 606, the component retrieves the orientation for the selected keyframe as the next orientation. In block 607, the component stores the retrieved keyframe information and loops to block 603 to select the next keyframe. In block 608, the component calculates a sequence of frames or trajectories for the keyframes. In block 609, the component initializes the Photosynth presentation component. In blocks 610-615, the component loops selecting each frame in the sequence and submitting it to the Photosynth presentation component. In block 610, the component selects the next frame in the sequence of frames. In decision block 611, if all the frames have already been selected, then the component returns, else the component continues at block 612. In block 612, the component submits the selected frame to the Photosynth presentation component. In block 613, the component sets the current keyframe number to the frame number of the selected frame and the current orientation to the frame orientation of the selected frame. In decision block 614, if a pause event has been received, then the component continues at block 615, else the component loops to block 610 to select the next frame. In block 615, the component waits for a resume event and then loops to block 610 to select the next frame. In some embodiments, the component may indicate when a keyframe is to be displayed by time within the stream, rather than frame number.

Figure 7:
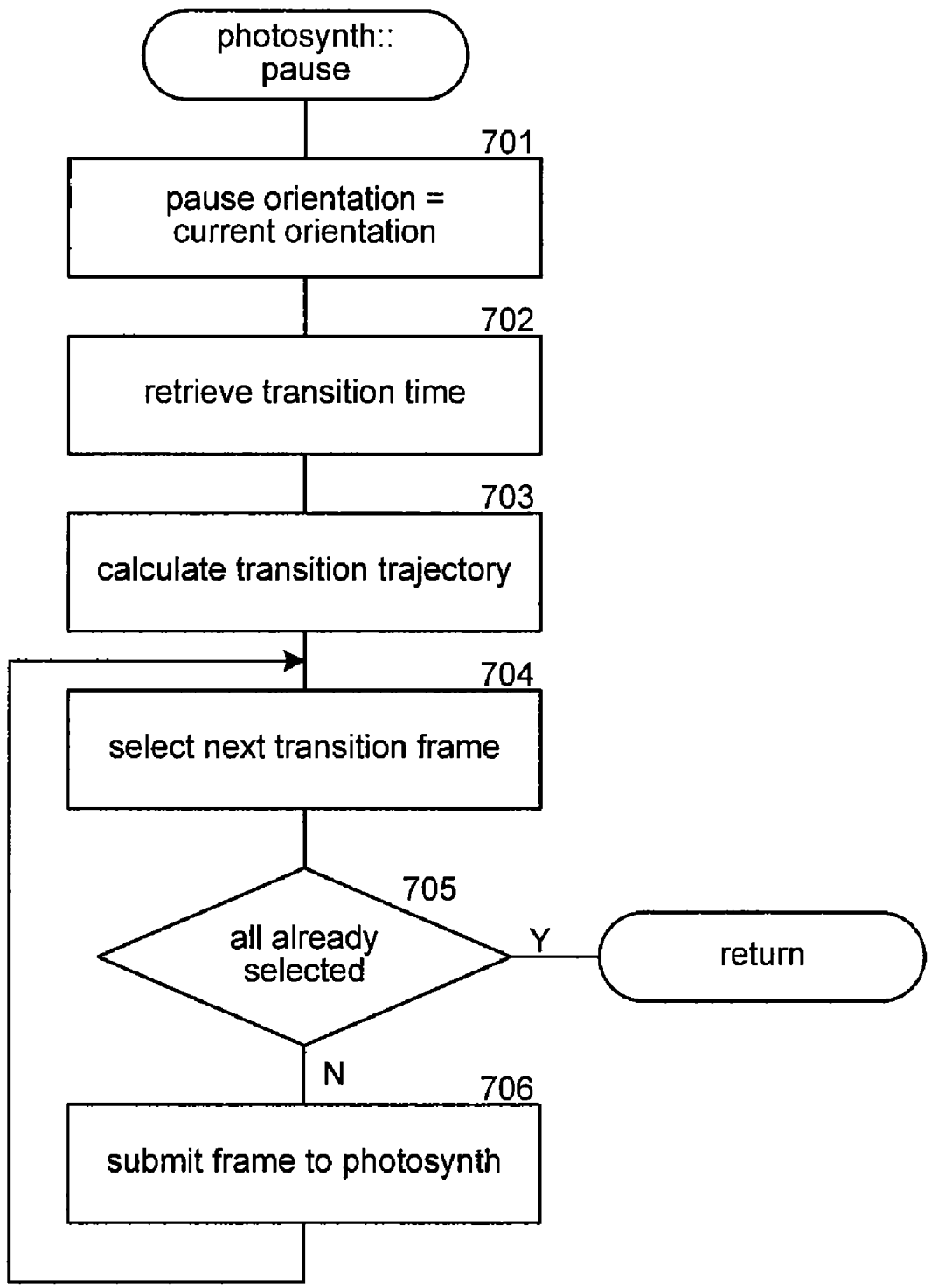
FIG. 7 is a flow diagram that illustrates the processing of a pause component of the Photosynth interface component in some embodiments.

FIG. 7 is a flow diagram that illustrates the processing of a pause component of the Photosynth interface component in some embodiments. The component is invoked by the narrative experience orchestrator component to notify the Photosynth interface component to pause the stream currently being presented. In block 701, the component sets a pause orientation to the current orientation. In general, the pause orientation could be set to any point in the narrative. In block 702, the component retrieves a transition time indicating how long it should take to transition to the pause. The transition time may be a global variable used by all interface components. In block 703, the component calculates a sequence of frames or transition trajectory to transition from the current orientation to a pause. In some embodiments, the component may implement a transition trajectory that gradually slows down the submitting of the frames to the Photosynth presentation component starting with the pause orientation for a short period followed by the submitting of those frames in reverse order, stopping at the pause orientation. In blocks 704-706, the component loops submitting the transition frames. In block 704, the component selects the next transition frame. In decision block 705, if all the transition frames have already been selected, then the component returns, else the component continues at block 706. In block 706, the component submits the selected transition frame to the Photosynth presentation component and then loops to block 704 to select the next transition frame.

Figure 8:
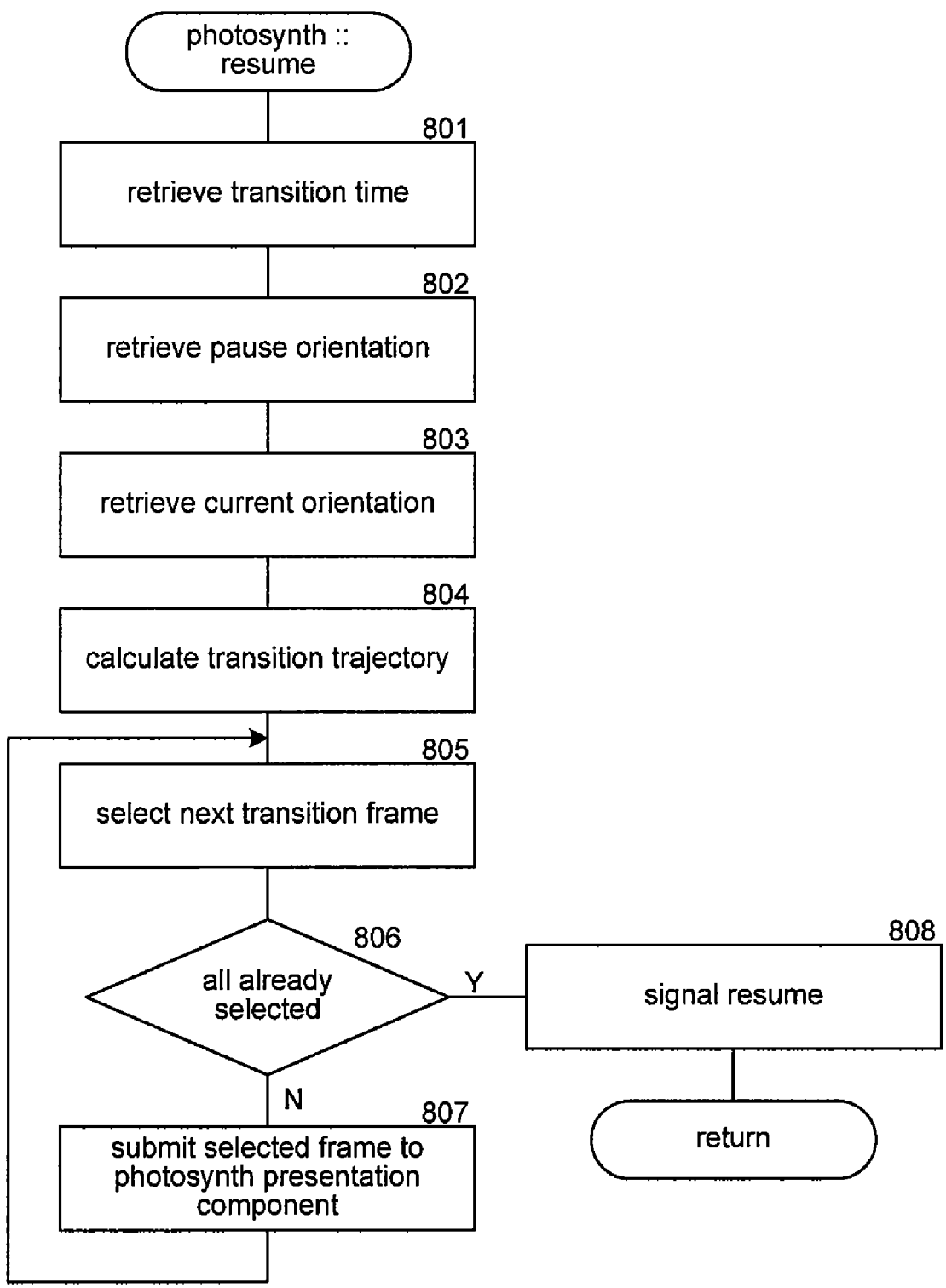
FIG. 8 is a flow diagram that illustrates the processing of a resume component of the Photosynth interface component in some embodiments.

FIG. 8 is a flow diagram that illustrates the processing of a resume component of the Photosynth interface component in some embodiments. The narrative experience orchestrator component invokes the resume component when the user indicates to resume a sub-narrative. In block 801, the component retrieves the transition time for transitioning from the navigated-to orientation to the pause orientation. In block 802, the component retrieves the pause orientation. In block 803, the component retrieves the current orientation, which corresponds to the navigated-to orientation. In block 804, the component calculates a sequence of transition frames or transition trajectory from the current orientation to the pause orientation by referring to the original trajectory calculated in block 608 and the point at which the pause occurred. In blocks 805-807, the component loops submitting the transition frames to the Photosynth presentation component. In block 805, the component selects the next transition frame. In decision block 806, if all the transition frames have already been selected, then the component continues at block 808, else the component continues at block 807. In block 807, the component submits the selected transition frame to the Photosynth presentation component and then loops to block 805 to select the next transition frame. In block 808, the component signals to resume so that the present function of the Photosynth interface component can resume presenting the Photosynth stream. The component then returns.

Figure 9:
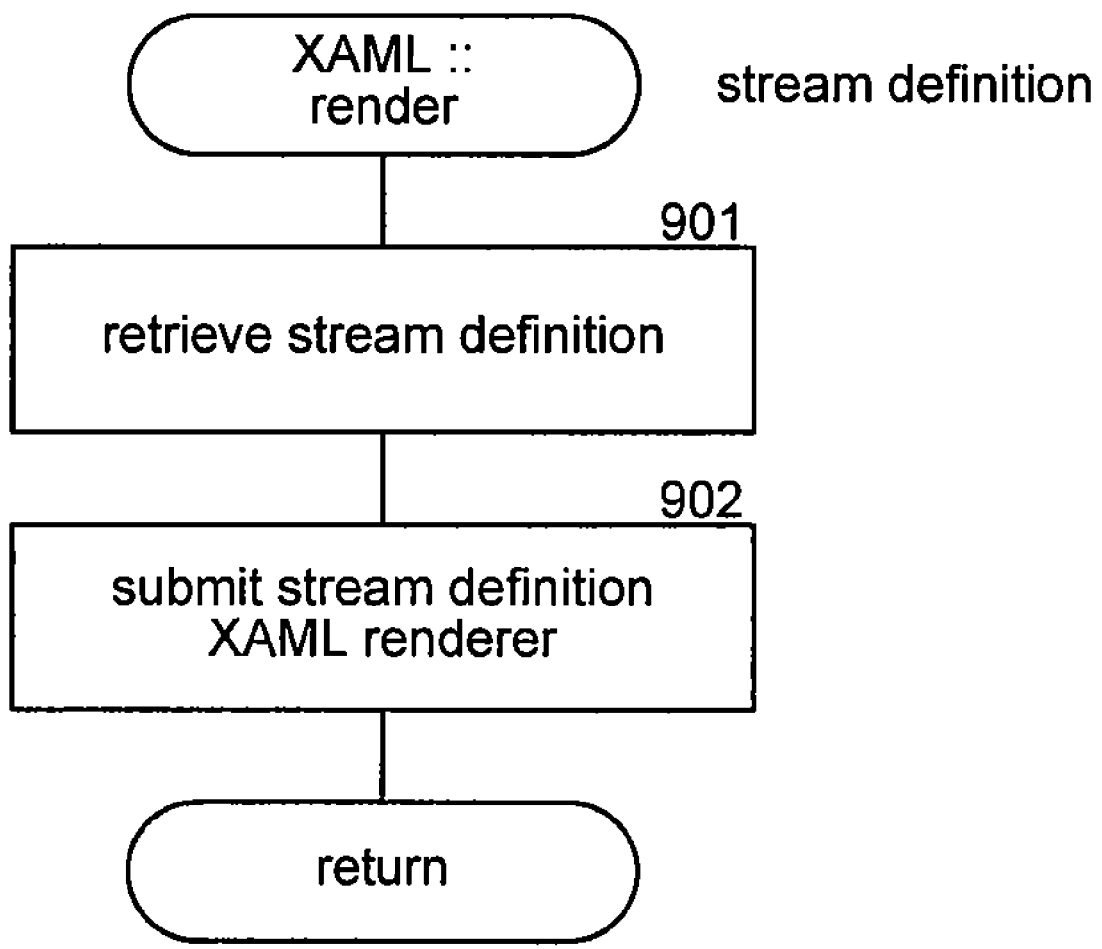
FIG. 9 is a flow diagram that illustrates the processing of a XAML interface component in some embodiments.

FIG. 9 is a flow diagram that illustrates the processing of a XAML interface component in some embodiments. The component is passed a stream definition defining the stream that is to be presented by the component. In block 901, the component retrieves the stream definition. In block 902, the component submits the stream definition to the XAML presentation component. The stream definition may indicate that any window for the XAML presentation component should be an invisible window so as not to obscure portions of any overlaid window. For example, the XAML window may overlay a window presented by the HD View presentation component. The component then returns.

Figure 10:
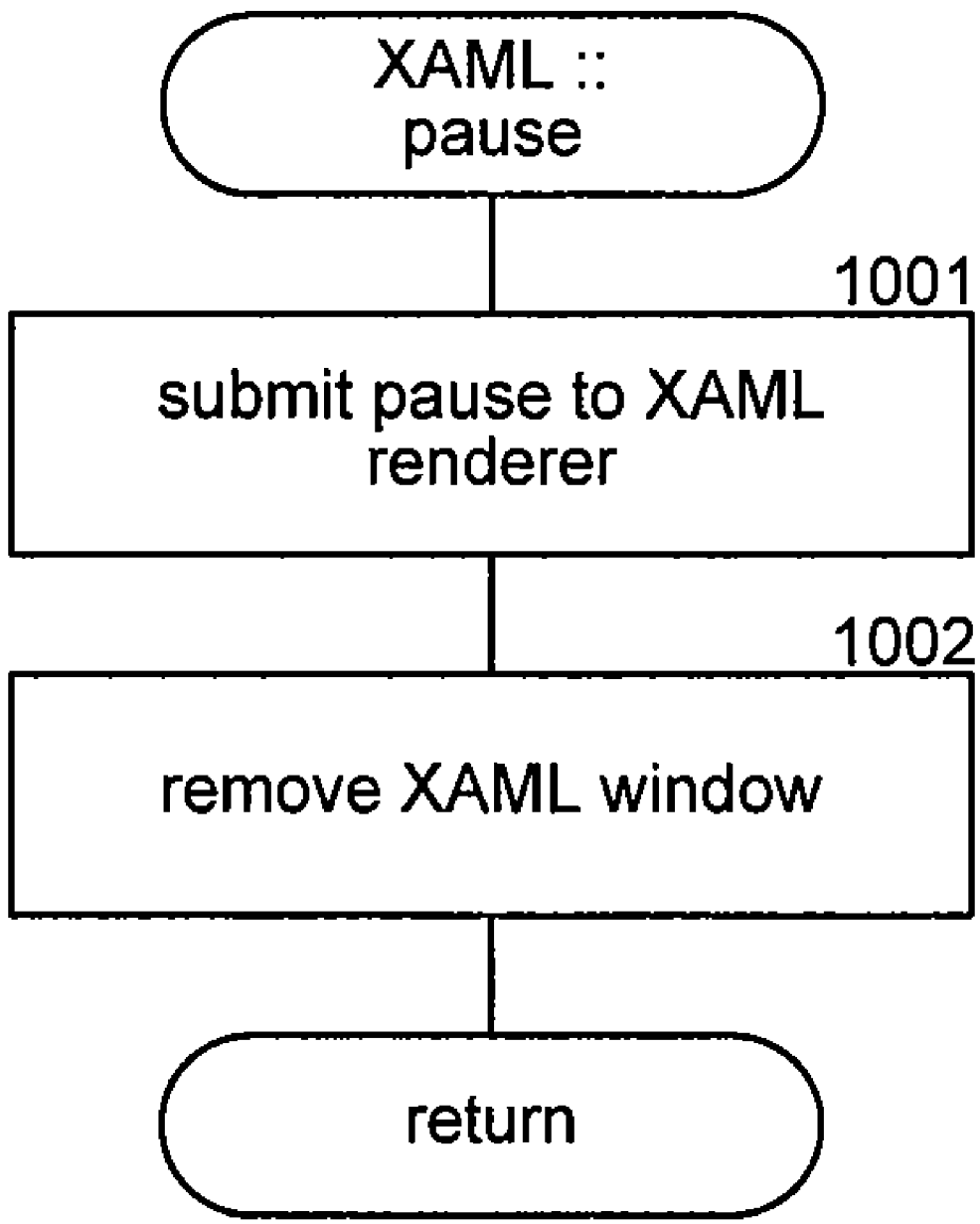
FIG. 10 is a flow diagram that illustrates the processing of the pause component of the XAML interface component in some embodiments.

FIG. 10 is a flow diagram that illustrates the processing of the pause component of the XAML interface component in some embodiments. The narrative experience orchestrator component invokes the pause component when a user selects to pause the sub-narrative currently being presented. In block 1001, the component submits a pause to the XAML presentation component using the XAML application interface. In block 1002, the component removes a XAML window that is currently being displayed. The visual removal of the XAML window (e.g., by making it fully transparent) allows user input during the pause to go directly to the underlying window. For example, if the underlying window is an HD View window, then the user input would be submitted to the HD View presentation component to allow the user to navigate around the gigapixel image during the pause. The component then returns. The component may pause an audio stream differently from a visual stream. For example, the component may cause the audio stream to fade out the foreground audio while fading in ambient noise or background audio to a constant level.

Figure 11:
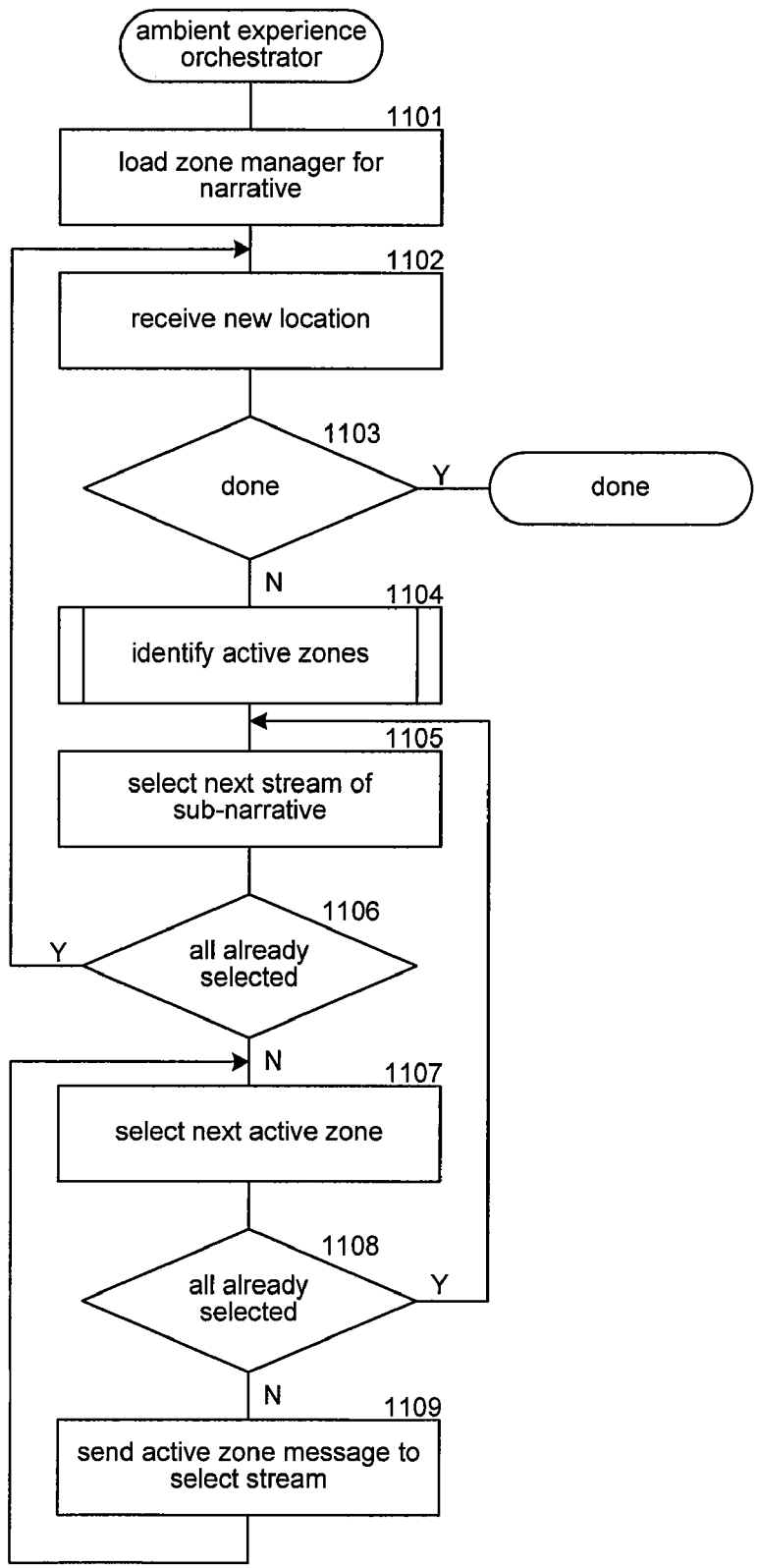
FIG. 11 is a flow diagram that illustrates the processing of an ambient experience orchestrator component in some embodiments.

FIG. 11 is a flow diagram that illustrates the processing of an ambient experience orchestrator component in some embodiments. In block 1101, the component loads the zone manager for the narrative. Alternatively, each sub-narrative may have its own zone manager. In blocks 1102-1109, the component loops identifying active zones and notifying the interface components of the currently active zones so that they can implement any ambient artifacts. In block 1102, the component receives an indication of a new location (or orientation). In decision block 1103, if the narrative is complete, then the component completes, else the component continues at block 1104. In block 1104, the component invokes an identify active zones component of the zone manager to identify the currently active zones based on the new location. In blocks 1105-1109, the component loops notifying the interface components of the active zones via the common application interface. In block 1105, the component selects the next stream of the sub-narrative. In decision block 1106, if all the streams of the current sub-narrative have already been selected, then the component loops to block 1102 to wait for a new location, else the component continues at block 1107. In blocks 1107-1109, the component loops notifying the selected stream of each active zone. In block 1107, the component selects the next active zone. In decision block 1108, if all the active zones have already been selected, then the component loops to block 1105 to select the next stream of the current sub-narrative, else the component continues at block 1109. In block 1109, the component sends an indication of the active zone to the selected stream and then loops to block 1107 to select the next active zone.

Figure 12:
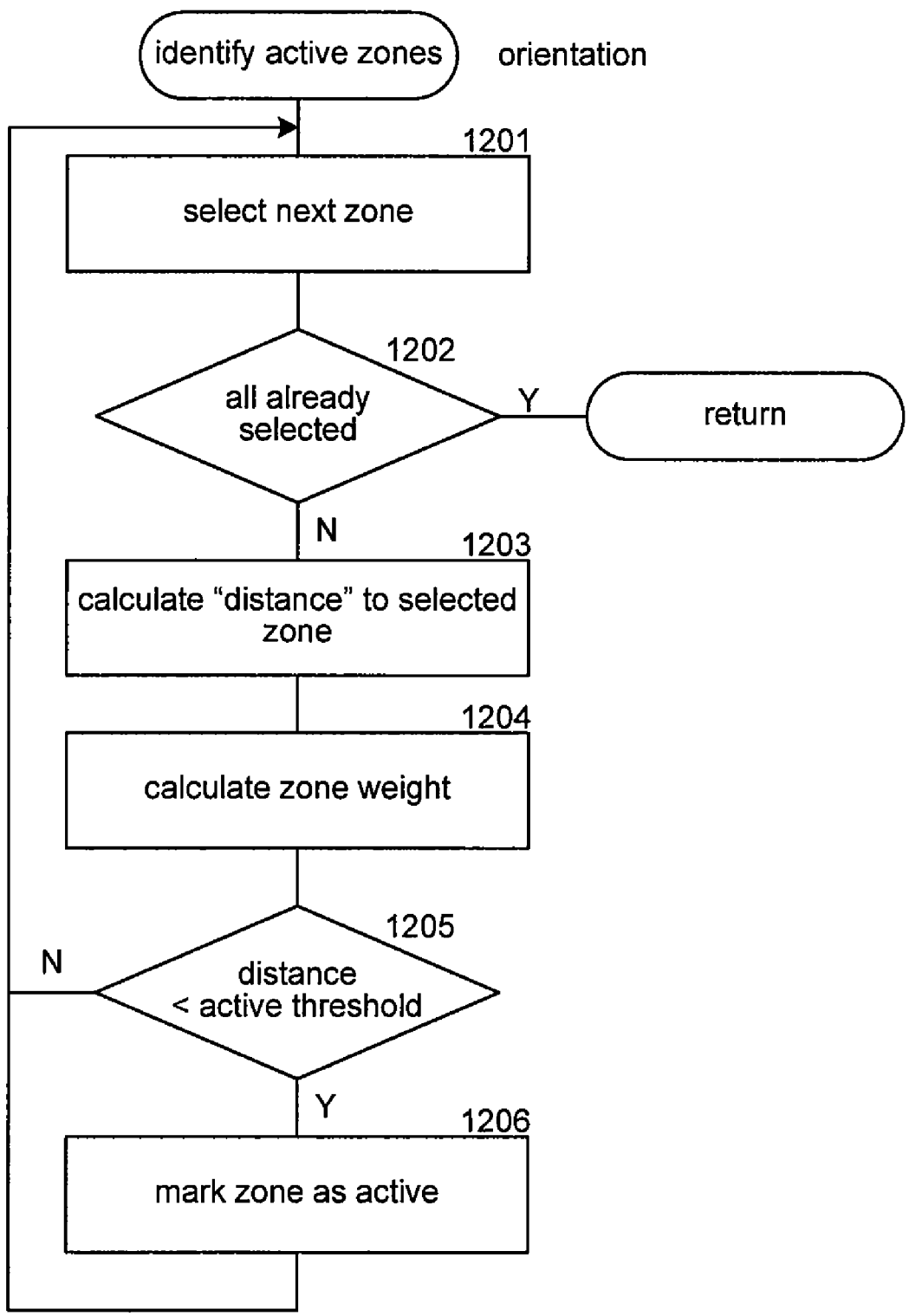
FIG. 12 is a flow diagram that illustrates the processing of an identify active zones component of a zone manager in some embodiments.

FIG. 12 is a flow diagram that illustrates the processing of an identify active zones component of a zone manager in some embodiments. The component is passed an indication of a location (or orientation) and identifies the active zones for that location. In block 1201, the component selects the next zone defined for the narrative. In decision block 1202, if all the zones have already been selected, then the component returns, else the component continues at block 1203. In block 1203, the component calculates the distance to the selected zone from the current location. In block 1204, the component calculates a zone weight for the selected zone. A zone weight indicates how active the zone is. For example, if the distance to the selected zone is zero, then the zone weight may be 1, indicating that the zone is completely active. If the distance to the selected zone is, for example, 10 feet, then the zone weight may be 0.5, indicating that the zone is half active. If the distance is greater than 20 feet, then the zone weight may be 0, indicating that the zone is not active. The interface components may use the zone weights to determine how to combine the artifacts for different zones that are somewhat active. For example, if a bell zone has a weight of 0.8 and an entry zone has a weight of 0.2, then an audio interface component may combine the audio for the bell zone and the entry zone so that the bell audio is four times as loud as the entry audio. In decision block 1205, if the distance to the zone is less than an active threshold for that zone, then the component continues at block 1206, else the component loops to block 1201 to select the next zone. An active threshold indicates a distance such that the zone is considered active. In block 1206, the component marks the zone as active and then loops to block 1201 to select the next zone.

We claim:
1. A computing device with a processor and memory for generating a multimedia experience stream, comprising:
a memory storing computer-executable instructions of:
a plurality of presentation components, each presentation component having a media type, each presentation component for presenting a stream of the media type and providing a type-specific interface for controlling the presenting of the stream, at least one presentation component having an orientation that includes location and provides a user interface for controlling the orientation as the stream is presented;
for each of the plurality of presentation components, an interface component that provides a common application interface for controlling the presenting of streams and that maps interactions with the common application interface to interactions with the type-specific application interface of the presentation component, the common application interface providing a pause and a resume control for controlling the pausing and resuming of a stream, the pausing of at least one stream allowing a user to use the user interface of the presentation component to navigate from a current orientation of the paused stream to a resume orientation of the stream, the resuming of at least one stream for automatically transitioning from the resume orientation to the pause orientation and continuing the presenting of the stream from the pause orientation;
a narrative definition defining the multimedia experience stream as a narrative with sub-narratives, each sub-narrative defining one or more streams that are part of that sub-narrative; and
a narrative experience orchestrator component that, for each sub-narrative of the narrative definition,
selects each stream of that sub-narrative and directs the interface component for the type of that stream to present the stream such that the streams of a sub-narrative are presented in parallel;
upon receiving from a user an indication to pause, directs each interface component that is currently presenting a stream to pause; and
upon receiving from the user an indication to resume, directs each interface component that is currently paused to resume; and
a processor that executes the computer-executable instructions stored in the memory.

2. The computing device of claim 1 wherein the transitioning from a resume orientation to a pause orientation includes generating a trajectory through content of the paused stream so that the pause orientation is attained after a transition period.

3. The computing device of claim 1 wherein the orientation includes a position and a direction associated with a view of the stream.

4. The computing device of claim 1 wherein a stream of a sub-narrative describes foreground and background audio of the sub-narrative such that while the stream is presented the output of the foreground audio is more dominant than the output of the background audio.

5. The computing device of claim 4 wherein when the stream is paused, the background audio is output while the foreground audio is not output.

6. The computing device of claim 1 wherein a stream with a frame-based media type of a sub-narrative defines a sequence of keyframes of the stream along with a view orientation of each keyframe.

7. The computing device of claim 6 wherein the interface component for a frame-based media type generates a sequence of frames of the stream that transitions from the view orientation of one keyframe to the view orientation of the next keyframe and submits the sequence of generated frames to the presentation component for the frame-based media type.

8. The computing device of claim 1 including a zone definition that defines zones within the multimedia experience stream, each zone associated with a region of orientations within the multimedia experience stream, and including an ambient experience orchestrator component that:
   receives an indication of a current orientation; and
   upon receiving an indication of a current orientation,
      provides the current orientation to a zone manager for the multimedia experience stream;
      receives from the zone manager an indication of active zones within the multimedia experience stream; and
      provides an indication of the active zones to the interface components of the multimedia experience stream so that the interface components can present ambient artifacts appropriate to the active zones.

9. The computing device of claim 8 wherein an ambient artifact is background audio associated with the current zone.

10. A method in a computing device with a processor and memory for generating a multimedia experience stream, the method comprising:
   providing a plurality of presentation components for presenting a stream of a certain media type using a type-specific application interface for controlling the presenting of the stream;
   providing, for each of the plurality of presentation components, an interface component that implements a common application interface for controlling the presenting of a stream by mapping interactions with the common application interface to interactions with the type-specific application interface of the presentation component;
   providing a narrative definition defining the multimedia experience stream as a narrative with sub-narratives, each sub-narrative defining one or more streams that are part of that sub-narrative; and
   for each sub-narrative of the narrative definition,
      selecting each stream of that sub-narrative and directing the interface component for the media type of that stream to present the stream such that the streams of a sub-narrative are presented in parallel;
      upon receiving from a user an indication to pause, directing each interface component that is currently presenting a stream to pause at a pause location; and
      upon receiving from the user an indication to resume, directing each interface component that is currently paused to resume presenting the stream at the pause location wherein when a user navigated to a different location of the content of the stream during the pause, the interface component for the stream effects a transition from the new location to the pause location before resuming the stream from the pause location.

11. The method of claim 10 wherein the transitioning from the new location to the pause location is attained after a transition period and each interface component resumes presenting of its stream from the pause location after the transition period.

12. The method of claim 10 wherein an interface component pauses with a pause direction and, when resuming, transitions to the pause direction from a new direction resulting from user navigation during the pause.

13. The method of claim 10 wherein a stream of a sub-narrative describes foreground and background audio of the sub-narrative such that while the stream is presented, output of the foreground audio is more dominant than output of the background audio.

14. The method of claim 10 wherein a sub-narrative defines configuration information for a stream with a frame-based media type that is a sequence of keyframes of the stream along with an orientation for each keyframe.

15. The method of claim 14 wherein the interface component for the frame-based media type generates a sequence of frames of the stream that transitions from the orientation of one keyframe to the orientation of the next keyframe and submits the sequence of generated frames to a presentation component for the frame-based media type.

16. The method of claim 10 including a zone definition that defines zones within the multimedia experience stream, each zone associated with a region within the multimedia experience stream, and including:
   receiving an indication of a current orientation from a presentation component; and
   upon receiving an indication of a current orientation,
      providing the current orientation to a zone manager for the multimedia experience stream;
      receiving from the zone manager an indication of active zones within the multimedia experience stream; and
      providing an indication of the active zones to the interface components of the multimedia experience stream so that the interface components can present ambient artifacts appropriate to the active zones.

17. A computer-readable storage medium embedded with computer-readable instructions for controlling a computing device to generate a multimedia experience stream, comprising:
   instructions implementing a plurality of presentation components for presenting a stream of a media type and providing a type-specific application interface for controlling the presenting of the stream, at least one presentation component having an orientation that includes position and direction for viewing the stream and having a user interface allowing a user to navigate content of the stream;
   for each of the plurality of presentation components, instructions implementing an interface component that provides a common application interface for controlling the presenting of streams and that maps interactions with the common application interface to interactions with the type-specific application interface, the common application interface providing a pause and a resume function for pausing and resuming of a stream, the pausing of at least one stream allowing a user to use the user interface of a presentation component to navigate from a current orientation to a different orientation of content of the stream, the resuming of at least one stream for automatically transitioning from the different orientation to the current view orientation at the time of the pause and continuing the presenting of the stream from the current orientation;
   instructions for accessing a narrative definition defining the multimedia experience as a narrative with sub-narratives, each sub-narrative defining one or more streams that are part of that sub-narrative; and
   instructions that, for each sub-narrative of the narrative definition,
      select each stream of that sub-narrative and direct the interface component for the media type of that stream to present the stream such that the streams of a sub-narrative are presented in parallel;

upon receiving from a user an indication to pause the multimedia experience stream, direct each interface component that is currently presenting a stream to pause; and upon receiving from the user an indication to resume, direct each interface component that is currently paused to resume presenting the paused stream.

18. The computer-readable storage medium of claim 17 wherein the transitioning from a different orientation to a current orientation includes generating a trajectory through the content of the stream so that the current orientation is attained after a transition period.

19. The computer-readable storage medium of claim 17 wherein a stream of a sub-narrative describes foreground and background audio of the sub-narrative such that while the stream is presented, output of the foreground audio is more dominant than output of the background audio.

20. The computer-readable storage medium of claim 17 including instructions to access a zone definition that defines zones within the multimedia experience stream, each zone associated with a region within the multimedia experience stream, and including instructions for:

receiving an indication of a current orientation; and upon receiving an indication of a current orientation,
  providing the current orientation to a zone manager for the multimedia experience stream;
  receiving from the zone manager an indication of active zones within the multimedia experience stream; and
  providing an indication of the active zones to the interface components of the multimedia experience stream so that the interface components can present ambient artifacts appropriate to the active zones.

* * * * *